US011984282B2

(12) United States Patent
Harrer et al.

(10) Patent No.: US 11,984,282 B2
(45) Date of Patent: May 14, 2024

(54) CIRCUIT BREAKER

(71) Applicant: Ellenberger & Poensgen GmbH, Altdorf (DE)

(72) Inventors: Hubert Harrer, Hilpoltstein, DE (US); Hendrik-Christian Koepf, Nuremberg (DE); Klaus Loos, Winkelhaid (DE); Klaus Werner, Roethenbach (DE); Juergen Zeberl, Lauterhofen (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 264 days.

(21) Appl. No.: 17/567,235

(22) Filed: Jan. 3, 2022

(65) Prior Publication Data

US 2022/0122791 A1 Apr. 21, 2022

Related U.S. Application Data

(63) Continuation of application No. PCT/EP2020/060729, filed on Apr. 16, 2020.

(30) Foreign Application Priority Data

Jul. 3, 2019 (DE) ..................... 10 2019 209 747.2

(51) Int. Cl.
*H01H 37/52* (2006.01)
*H01H 21/22* (2006.01)
*H01H 21/36* (2006.01)

(52) U.S. Cl.
CPC ............ *H01H 37/52* (2013.01); *H01H 21/22* (2013.01); *H01H 21/36* (2013.01)

(58) Field of Classification Search
CPC ........ H01H 37/52; H01H 21/22; H01H 21/36; H01H 71/503; H01H 71/522; H01H 71/528; H01H 73/045; H01H 71/501
See application file for complete search history.

(56) References Cited

U.S. PATENT DOCUMENTS 3,548,358 A 12/1970 Klein
4,392,036 A * 7/1983 Troebel ................ H01H 71/501 200/322

(Continued)

FOREIGN PATENT DOCUMENTS

CN 1934670 A 3/2007
CN 101461022 A 6/2009

(Continued)

OTHER PUBLICATIONS

Sanchez Bertrand; Grand Philippe; De La Borderie Francois, "Electric Current Shut-Off Device Having Complete Discrimination of States", Mar. 24, 2005, Entire Document (Translation of WO 2005027169). (Year: 2005).*

(Continued)

*Primary Examiner* — Stephen S Sul
(74) *Attorney, Agent, or Firm* — Muncy, Geissler, Olds & Lowe, P.C.

(57) ABSTRACT

A circuit breaker, in particular of a power breaker, having a busbar which is mounted so as to be movable between a closed position and an open position. The busbar, a trip device and a hand lever are coupled by means of the mechanism in such a way that, when the hand lever is moved from the first position into the second position, the busbar is moved from the open position into the closed position. Upon tripping of the trip device, the busbar is moved from the closed position into the open position, and the hand lever is moved from the second position into the first position if it is not blocked. When the hand lever is moved from the second position into the first position, the busbar is moved from the closed position into the open position regardless of whether the busbar is blocked in the closed position.

8 Claims, 7 Drawing Sheets

(56) References Cited

U.S. PATENT DOCUMENTS

| | | | | |
|---|---|---|---|---|
| 6,218,919 | B1 * | 4/2001 | Ciarcia | H01H 71/525 335/172 |
| 6,225,881 | B1 * | 5/2001 | Felden | H01H 71/04 335/172 |
| 7,561,017 | B2 * | 7/2009 | Darr | H01H 21/025 337/72 |
| 7,760,055 | B2 | 7/2010 | Adunka et al. | |
| 7,978,033 | B2 | 7/2011 | Loos et al. | |
| 8,098,119 | B2 | 1/2012 | Birner et al. | |
| 9,275,811 | B2 | 3/2016 | Naiman et al. | |
| 9,543,083 | B2 * | 1/2017 | Darr | H01H 71/123 |
| 9,799,462 | B2 * | 10/2017 | Feil | H01H 71/14 |
| 2004/0056750 | A1 * | 3/2004 | Kawata | H01H 9/342 337/112 |
| 2005/0061648 | A1 * | 3/2005 | Schmid | H01H 21/42 200/400 |
| 2006/0125596 | A1 * | 6/2006 | Darr | H01H 21/16 337/194 |
| 2011/0089006 | A1 * | 4/2011 | Wan | H01H 71/526 200/323 |
| 2011/0163836 | A1 * | 7/2011 | Darr | H01H 9/282 337/143 |
| 2013/0267975 | A1 | 10/2013 | Timm et al. | |

FOREIGN PATENT DOCUMENTS

| | | | | |
|---|---|---|---|---|
| CN | 101461023 | A | 6/2009 | |
| CN | 103227079 | A | 7/2013 | |
| CN | 107086138 | A | 8/2017 | |
| DE | 2 023 797 | | 11/1970 | |
| DE | 30 33 213 | A1 | 3/1982 | |
| DE | 103 29 392 | A1 | 1/2004 | |
| DE | 10 2004 062 269 | A1 | 7/2006 | |
| DE | 60 2004 005 723 | T2 | 12/2007 | |
| EP | 1 515 352 | A1 | 3/2005 | |
| JP | S49-047164 | | 4/1974 | |
| JP | S4947164 | U | 4/1974 | |
| JP | S50130664 | U | 10/1975 | |
| JP | S5355758 | U | 5/1978 | |
| JP | S60148026 | A | 8/1985 | |
| JP | H0883552 | A | 3/1996 | |
| JP | 2016033892 | A | 3/2016 | |
| WO | WO 2004/073008 | A1 | 8/2004 | |
| WO | WO-2005027169 | A1 * | 3/2005 | H01H 71/04 |

OTHER PUBLICATIONS

Japanese Office Action dated Apr. 5, 2023 in corresponding application JP2021-577686.

* cited by examiner

CIRCUIT BREAKER

This nonprovisional application is a continuation of International Application No. PCT/EP2020/060729, which was filed on Apr. 16, 2020, and which claims priority to German Patent Application No. 10 2019 209 747.2, which was filed in Germany on Jul. 3, 2019, and which are both herein incorporated by reference.

BACKGROUND OF THE INVENTION

Field of the Invention

The present invention relates to a circuit breaker. The circuit breaker serves in particular to protect a line or a specific device. The circuit breaker has, for example, the function of a separating switch and is preferably a component of a power breaker.

Description of the Background Art

Circuit breakers usually have an electrical switching system. More commonly, the electrical switching system is preferably mechanical, so that galvanic isolation is also possible. In this case, the electrical switching system usually has a contact and a mating contact mounted to be movable for this purpose. In particular, the contact and the mating contact are each connected to a busbar, wherein they are usually supported by means of the busbar. If the circuit breaker is in the closed state, i.e., power supply is possible by means of the circuit breaker, the contact rests on the mating contact so that there is a direct mechanical connection between them. An electrical current flows across the contact and the mating contact.

In the closed state of the circuit breaker, the busbars are thus in a closed position, wherein the busbars are usually brought into the closed position by means of a hand lever which is coupled to the busbar by means of a mechanism. The hand lever itself usually has two positions, one of which corresponds to the closed position of the busbars and the other position to the open position of the busbars.

When the circuit breaker trips, the two busbars are spaced apart and thus moved to the open position. This means that current flow is no longer possible. Spacing should take place comparatively fast, which is why at least one of the busbars is usually spring-loaded, wherein the spring acts in the direction of the open position. It is also necessary for the hand lever to be moved into the other position, so that on the one hand the release is recognizable for the user. On the other hand, this way it is again possible to move the busbars back into the closed position. If, however, the overload condition persists, e.g., the fault is not corrected, it is necessary that the busbars are brought back into the open position essentially without delay. Since the hand lever is usually still blocked because of the user, a so-called trip-free mechanism is available in which the busbars can be moved into the open position even if the hand lever is blocked. This results in partial decoupling of the hand lever from the busbars so that the busbars can be moved in only one direction relative to each other by means of the hand lever, i.e., from the open position into the closed position.

If a comparatively strong electrical current occurs during the overload case, it is possible for an arc to form between the contact and the mating contact, which leads to burnout of the contact or mating contact. This can result in partial melting of the contact or mating contact. If the mating contact is then brought into contact with the contact in a timely manner, the contact fuses with the mating contact, as these are partially liquefied on the surface. This means that after cooling, it is no longer possible to space them apart simply with the spring force acting on them. The circuit breaker can therefore no longer be used, as due to the fusion of the contact with the mating contact, hence due to a deliberate interruption of the electrical current, it can no longer be tripped.

SUMMARY OF THE INVENTION

It is therefore an object of the present invention to provide a particularly suitable circuit breaker, wherein advantageously reliability and/or duration of use is increased.

The circuit breaker is used to conduct and interrupt an electrical current. The circuit breaker is suitable, in particular provided and configured for this purpose. In addition, the circuit breaker is suitably designed mechanically. Preferably, a rated current conducted by means of the circuit breaker is between 1 A and 125 A, suitably between 1 A and 30 A, between 30 A and 60 A or between 60 A and 100 A. The circuit breaker is suitable, in particular provided and adapted to carry an alternating electrical current having in particular an electric voltage between 100 V and 800 V or, for example, of 277 V, 480 V or 600 V. Alternatively, the circuit breaker is suitable, in particular provided and adapted to carry a direct electrical current, wherein the electrical voltage in this case is in particular between 100V and 1,500V. Preferably, the circuit breaker is used in an industrial plant, in particular in industrial automation. Alternatively, the circuit breaker is a component of a building installation.

The circuit breaker is used in particular to protect a device, such as an electric motor, or an electric line. For this purpose, the circuit breaker is used in particular to monitor an electrical voltage and/or an electrical current for the presence of an overload event and then, if at least one of the values exceeds a certain limit value and/or a change of the respective value within a certain period of time is greater than a further limit value, the electrical current is interrupted.

The circuit breaker has a busbar that is mounted between a closed position and an open position. It is possible for the busbar to assume either the closed position or the open position. In other words, the busbar can assume both the closed position and, subsequently, the open position, and vice versa. The two positions are different, and in the closed position there is an electrical current flowing over the busbar during operation. In other words, in the closed position, current can flow over the busbar. In the open position, however, the current cannot flow over the busbar during operation. In particular, in the open position, the busbar is spaced apart from other components of the circuit breaker to which an electrical potential is applied. Preferably, the busbar is galvanically isolated from the other components.

During operation, and when the busbar is in the closed state, the electrical current flows through it. The busbar is therefore at least partially made of a metal, preferably copper, i.e., pure copper or a copper alloy. Thus, ohmic resistance is comparatively low. The busbar can be provided with a coating consisting, for example, of a nickel, a tin, or a silver. As a result, a chemical reaction of the other components of the busbar, in particular the copper, is prevented or at least slowed down. It is also possible in this way to attach other components to the busbar, for example by means of soldering and or welding.

In the open position of the busbar, the circuit breaker is thus in an electrically non-conductive state, so that no electrical current is carried over the circuit breaker. In other words, it is not possible to energize any device protected by the circuit breaker. In the closed position of the busbar, the circuit breaker is in the electrically conductive state, so that in this case power is supplied to the device.

The circuit breaker also has a trip device. By means of the trip device, a reaction takes place in the event of an overload, i.e., if the electrical current conducted by the circuit breaker or the electrical voltage applied thereto exceed the respective conditions resulting in an overload.

In particular, the trip device can be at least partially mechanical, so that a mechanical responses of the trip device takes place when the overload occurs.

In addition, the circuit breaker has a hand lever which can be moved between a first position and a second position and back again. In other words, it is possible to move the hand lever into the first position or into the second position. By means of the hand lever, manual actuation of the circuit breaker is possible. In other words, the hand lever is operated by a user to operate the circuit breaker. Here, the first position corresponds to the electrically non-conductive state of the circuit breaker, i.e., an open state. Consequently, the first position corresponds to the open position of the busbar. The second position of the manual switch corresponds to the electrically conductive state of the circuit breaker and thus to the closed position of the busbar.

The circuit breaker also has a mechanism by means of which the busbar, the trip device and the hand lever are coupled. Consequently, it is possible to act on the busbar by means of the hand lever. It is also possible to actuate the busbar by means of the trip device. The coupling is such that when the hand lever is moved from the first position to the second position, the busbar is moved from the open position into the closed position. Thus, by operating the hand lever, the circuit breaker is set to the electrically conductive state. In the electrically non-conductive state, in particular, the hand lever is in the first position and the busbar is in the open position. Preferably, the hand lever and/or the busbar are held in the second position, i.e., the closed position, in particular by means of a locking of the mechanism and/or the trip device. The locking is released in particular upon tripping of the trip device.

Furthermore, the coupling is such that upon tripping of the trip device, the busbar is moved from the closed position into the open position. In other words, upon tripping of the trip device, the busbar, if in the closed position, is moved into the open position. In this case, if the busbar is already in the open position, it remains in this position upon tripping of the trip device. In addition, upon tripping of the trip device, the hand lever is moved from the second position into the first position if it is not blocked. However, if the hand lever is blocked in the second position, e.g., due to a manual operation, the busbar is nevertheless moved from the closed position into the open position upon tripping of the trip device, and the hand lever remains in the second position. As soon as the blockage is removed, the hand lever is conveniently moved into the first position.

In summary, the movement of the busbar is independent of the movement of the hand lever and always occurs upon tripping of the trip device. Due to the movement of the busbar from the closed position into the open position upon tripping of the trip device, the electrical current flowing over the circuit breaker is interrupted, which increases safety and corresponds to the operation of the circuit breaker. If the hand lever is moved into the first position, the user can see that the circuit breaker is in the electrically non-conductive state. Also, in this case, by moving the hand lever from the first position into the second position, it is possible to move the busbar back from the open position into the closed position. However, if the hand lever is blocked in the second position, e.g., due to a user operation, the electrical current is still interrupted due to moving the busbar into the open position, independent of the movement of the hand lever, which increases safety. In summary, the circuit breaker also has the function of a trip-free mechanism.

Also, the coupling by means of the mechanism is such that when the hand lever is moved from the second position into the first position, the busbar is moved from the closed position into the open position. For example, in this case the possible locking is canceled. Thus, by operating the hand lever, it is also possible to move the circuit breaker from the electrically conductive state into the electrically non-conductive state. In this case, moving the busbar from the closed position into the open position is independent of whether the busbar is blocked in the closed position. In other words, the busbar is moved from the closed position into the open position when the busbar is essentially free to move. However, if the busbar is blocked in the closed position, it is also moved into the open position when the hand lever is moved. In again other words, a force is exerted on the busbar by means of the hand lever so that it is moved into the open position. As a result, it is possible to manually exert a force on the busbar by means of the hand lever via the mechanism, wherein the force exerted is a function of the force exerted on the hand lever.

If the busbar is blocked in the closed position, the hand lever is in particular also held in the second position or at least in a position between the first and second position, i.e., in an intermediate position. When the hand lever is further moved (manually) into the first position, the force acting on the hand lever is redirected by means of the mechanism on the busbar so that the force acts on it. In other words, the busbar is unblocked by means of the hand lever. If the busbar is blocked in the closed position, and if consequently the busbar remains in the closed position even upon tripping of the trip device, it is possible to use the hand lever to move the busbar back into the open position.

Such blockage occurs, for example, due to partial fusion of the busbar with other components of the circuit breaker, in particular if a comparatively strong overload case has preceded, which has led to partial liquefaction of the busbar. Due to the design of the mechanism, such a fusion is thus broken up. As a result, any electrical current flowing further over the circuit breaker is interrupted by actuating the hand lever, which increases safety. The circuit breaker is then ready for use again, in particular if the electrical current has been terminated by another overcurrent protection device, especially a fuse. Due to the mechanism, it is thus possible to continue using the circuit breaker even after a comparatively severe overload event, which increases service life. Consequently, it is not necessary to replace the circuit breaker, which reduces operating costs. The mechanism also makes it possible to check whether the busbar has been moved into the closed position by operating the hand lever, which increases reliability.

The circuit breaker conveniently comprises a housing in which the mechanism, the busbar, the trip device and at least partially the hand lever are accommodated. In particular, the hand lever is mounted by means of the housing. The housing is expediently made of an electrically non-conductive material, preferably a plastic. Due to the housing, electrical insulation is provided, so that injury to persons is excluded. Also, penetration of dirt particles into the interior of the circuit breaker is prevented or predominantly reduced, which could impair the functioning of the mechanism.

The hand lever is suitably made of an electrically non-conductive material, preferably a plastic. This prevents injury to a person, in particular the user, even in the event of a malfunction of the circuit breaker, when said user touches the hand lever.

The circuit breaker has, for example, the function of a separating switch. A circuit breaker is understood to be a contact system with a trip unit and a signaling and/or indication of the switching state, wherein the signaling/indication describes in particular the separating function. In this case, the switching state is expediently indicated with forced guidance. The trip unit is preferably an overcurrent trip or at least comprises the same. In summary, the circuit breaker assumes the function of a separating switch. The circuit breaker is preferably a component of a power breaker which comprises, for example, a fail-safe element, such as a fuse, which is electrically connected in series with the circuit breaker. Thus, a power breaker with a separating function and fuse is provided.

Preferably, the mechanism has a slider that is displaceably mounted in a transverse direction. In other words, the slider is mounted for transverse displacement along the transverse direction. This makes it possible to move the slider in the transverse direction, wherein the displacement movement is limited, for example, by two stops or at least by one stop. The slider is connected to the busbar. Thus, when the slider is moved, the busbar is moved between the open and closed positions. For example, the slider is connected to the busbar by means of a joint, which busbar is moved by the slider between the open and closed positions. Particularly preferably, however, the busbar is rigidly attached to the slider so that the busbar is also supported by means of the slider so that it can be moved in the transverse direction. Consequently, strain and risk of breakage are reduced.

For example, another component can be mechanically arranged between the slider and the busbar. Particularly preferably, however, the slider is attached directly to the busbar. As a result, the number of components required is reduced and durability is increased. The slider is, for example, electrically non-conductive and preferably made of a plastic, in particular in a plastic injection molding process. Thus, no electrical current is carried by the slider, and the latter has essentially no electric potential during operation, which makes further insulation essentially unnecessary. Due to the slider, it is possible to move the busbar between the open and closed positions without any further contact with the busbar. This increases safety.

Preferably, the slider is spring-loaded. In other words, the circuit breaker comprises a spring which acts in particular on the slider, for example directly, or indirectly via a further component. In this case, the spring is expediently supported against a further component of the circuit breaker, in particular its housing. Preferably, the spring is compressed when the busbar is moved from the open into the closed position. Thus, the spring force acts on the slider and consequently on the busbars, which loads the slider in such a way that the busbar is brought into the open position. The circuit breaker conveniently comprises a locking mechanism by means of which the slider or another component of the mechanism that is connected to the slider is locked when the busbar is in the closed position. Expediently, the locking mechanism is actuated by means of the trip device so that the locking is released upon tripping of the trip device. As a result, the busbar is brought from the closed position into the open position by the spring. The spring may be, for example, a helical spring, which reduces manufacturing costs. Alternatively, the spring can be a torsion spring, leaf spring, disc spring or (compression) air spring. In summary, the slider is spring-loaded by the spring in such a way that, upon tripping of the trip device, the busbar is moved from the closed position into the open position.

For example, the hand lever can be moved transversely along a direction between the first position and the second position and is thus mounted so that it can be moved transversely. Particularly preferably, however, the hand lever is rotatably mounted about an axis of rotation, which reduces the space requirement. Thus, the hand lever is pivoted/rotated about the axis of rotation when moving from the first position into the second position. In particular, the mechanism has a torsion spring by means of which the hand lever is spring-loaded towards the first position. In other words, the torsion spring is tensioned when the hand lever is moved into the second position. For this purpose, the torsion spring is eccentrically supported on the hand lever on the one hand and on the other hand in a fixed position, preferably on the possible housing of the circuit breaker. Expediently, the possible locking is present so that the hand lever is held in the second position against the force of the spring. If the locking mechanism is released, in particular due to the tripping of the trip device or manual operation of the hand lever, the hand lever is moved from the second position into the first position. However, if the lever is blocked in the second position and is held with a force greater than the spring force, the hand lever remains in the second position. When the blockage is subsequently released, the lever is preferably moved into the first position due to the torsion spring, regardless of whether the trip device has triggered or not.

Preferably, the mechanism comprises a first coupling element that is rotatably mounted on the hand lever eccentrically to the axis of rotation. It is possible to rotate the first coupling element with respect to the hand lever, wherein when the hand lever is rotated about the axis of rotation, the first coupling element, or at least its connection point on the hand lever, also rotates about the axis of rotation. Preferably, the axis of the rotatable mounting of the first coupling element on the hand lever is parallel to the axis of rotation. One end of the coupling element is conveniently rotatably connected to the hand lever, which reduces the space requirement.

The first coupling element is further guided in a first link of the slider. The link is in particular a recess of the slider, wherein preferably the first coupling element engages in the first link, expediently an end of the first coupling element. Here, it is possible to move the first coupling element within the first link with respect to the slider. A removal of the first coupling element from the first link, on the other hand, is not possible, for example. For example, it is not possible to space apart the first coupling element from the first link in at least one or two directions, whereas, for example, it is possible to insert the first coupling element unhindered into the first slide in a direction perpendicular to the transverse direction, for example parallel to the axis of rotation. This simplifies assembly.

The first link includes a section extending in the transverse direction. This makes it possible to move the slider in the transverse direction independently of the hand lever. Thus, it is possible to move the busbar from the open position into the closed position and therefore also the slider, in particular by means of further components of the mechanism, even if the hand lever is blocked in the second position. On the other hand, in particular when the busbar is blocked in the closed position, and when the hand lever is moved from the second position into the first position, the first coupling element is moved against a boundary of the first link in the transverse direction, so that when the hand lever is moved further over the first coupling element, the force acting on the hand lever is introduced into the slider. Due to the first coupling element, it is thus possible to exert force on the busbar so that this is moved from the closed position into the open position, wherein the first link, in particular due to the section extending in the transverse direction, ensures that other functions of the circuit breaker are not impaired.

The first coupling element can be, for example, made in one piece and is in particular U-shaped or formed by means of a straight component. In this case, the two ends preferably engage in the hand lever or the first link. In this way, a comparatively simple design of the first coupling element is created, which reduces manufacturing costs. In an alternative, the first coupling element is, for example, curved or comprises several components, preferably deflection bodies. The force acting on the slider when the hand lever is actuated can thus be adjusted. In particular, a lever arm is utilized so that the force exerted by the hand lever is comparatively large. The maximum distance along which the force must act is comparatively small, since only the blockage of the busbar in the closed position is to be released.

Suitably, the first coupling element can be made of a comparatively strong material; preferably, the first coupling element is made of a metal, such as steel. This increases durability. Preferably, the slider is made of a plastic material, so that an electrical potential of the first coupling element is independent of the electrical potential of the busbar. The first coupling element is preferably made of a steel wire and preferably manufactured in the manner of a clamp.

Preferably, the mechanism includes a second coupling element which is rotatably mounted on the hand lever eccentrically to the axis of rotation, wherein the axis about which the mounting takes place is preferably parallel to the axis of rotation. For example, the distance of the second coupling element to the axis of rotation is smaller than or equal to the distance of the first coupling element to the axis of rotation. Particularly preferably, however, the distance of the second coupling element to the axis of rotation is greater than the distance of the first coupling element to the axis of rotation. This means that the second coupling element is moved a greater distance when the hand lever is moved. The second coupling element is guided in a second link of a rocker arm of the mechanism. The second link is, for example, straight or curved. The rocker arm itself is rotatably mounted on the slider, in particular at the end, wherein the axis is preferably parallel to the axis of rotation. The second link is offset away from the bearing point of the rocker arm on the slider. Thus, when the hand lever is rotated about the axis of rotation, the second coupling element is moved within the second link until it abuts against a stop of the second link. The rocker arm is then rotated with respect to the slider.

The second coupling element can be, for example, a straight section or U-shaped and thus embodied in particular by a clamp. Preferably, one of the ends is connected to the hand lever, whereas the other end is inserted in the second link. Due to the U-shaped design, it is comparatively simple to assemble the second coupling element, namely by inserting it into the corresponding receptacles parallel to the axis of rotation. Alternatively, the second coupling element can be, for example, curved and thus include at least one or more bends. Preferably, the second coupling element is made of a metal, preferably a steel, for example a steel wire. This increases durability.

Suitably, the mechanism has a first locking lever which is rotatably mounted, preferably on the possible housing and/or expediently about an axis, which is parallel to the axis of rotation. The first locking lever is actuated by means of the trip device. In other words, the coupling of the mechanism with the trip device is accomplished by means of the first locking lever. Preferably, upon tripping of the trip device, the locking lever is rotated. In particular, the first locking lever is spring-loaded so that it is returned to its original position after rotation due to the tripping of the trip device. The first locking lever has a support point that is arranged eccentrically to the rotatable mounting. Thus, when the first locking lever is rotated, the support point is turned, i.e., rotated. The support point is provided for the rocker arm and is in particular spaced apart from the second link.

The support point serves to limit the pivoting movement (rotation/turning) of the rocker arm with respect to the slider. In other words, when the hand lever is moved and the second coupling element is moved in the second link up to the stop, the rocker arm is first rotated with respect to the slider until the rocker arm again rests the support point. In particular, the rocker arm rests at the end, i.e., at the end opposite the slide, against the support point. If there is a further rotary movement, this movement results in a pivoting of the rocker arm around the support point and thus in a movement of the slide in the transverse direction. In particular, here the busbar is moved into the closed position. When the busbar is in the closed position, the second coupling element in particular is arranged essentially in the transverse direction, so that the slider is held in this position in an unstable equilibrium against the possible spring acting on the slider. Therefore, when the first locking lever is moved due to the trip device, the unstable equilibrium is lifted, and the slider is moved in the transverse direction by means of the spring. On the other hand, if no comparatively large perturbation takes place, the slider is locked by means of the second coupling element arranged substantially in the transverse direction. In a variation, the second coupling element is arranged slightly oblique instead of in the transverse direction, wherein, however, a further movement of the second coupling element is hindered by means of the second link, which in particular is slightly curved.

If, when the hand lever is locked, the first locking lever is partially rotated by means of the trip device, the rocker arm is no longer locked by means of the locking lever but can only be rotated with respect to the slider. In this case, the prevailing weight force causes the rocker arm in particular to pivot with respect to the slider, which leads to a change in position of the second coupling element. Therefore, the unstable equilibrium is also lifted. This in turn allows for the slider to move in the transverse direction, so that the busbar is moved into the open position. In summary, the hand lever is decoupled from the busbar by means of the support point and the second link.

The first link can be L-shaped, wherein one section extends in the transverse direction, and wherein said first link has a further section which extends perpendicularly to the transverse direction, in particular in a longitudinal direction. A third coupling element is suitably rotatably mounted on the first coupling element, wherein the connection of the third coupling element to the first coupling element is suitably made between the ends of the first coupling element, or at least between the points of connection to the hand lever and the engagement in the first link. This makes it possible to move the first coupling element in the first link by means of the third coupling element. If the first coupling element is located in the section running perpendicular to the transverse axis, a substantially direct coupling of the hand lever with a movement of the busbar takes place so that a movement of the hand lever corresponds to a movement of the busbar. This makes it possible to move the busbar into the closed position by means of the hand lever. The hand lever can also be used to act on the busbar if it is locked in the closed position. Thus, it is possible to break the blockage. In summary, when the hand lever is moved from the first position into the second position, the busbar is moved from the open position into the closed position, and then, when the hand lever is moved from the second position into the first position, the busbar is moved from the closed position into the open position, wherein a force can also be exerted on the busbar by means of the hand lever.

On the other hand, when the first coupling element is moved to the section of the first link running in the transverse direction, the hand lever is decoupled from the busbar so that the circuit breaker can be tripped even if the hand lever is locked. Therefore, when the first coupling element is located in the section extending in the transverse direction, it is also possible to move the busbar from the closed position into the open position, even if the hand lever is blocked.

The third coupling element can be guided in a link of a second locking lever, which is rotatably mounted, preferably about an axis parallel to the axis of rotation. In particular, the mounting is done on the possible housing of the circuit breaker, and the second locking lever is actuated by means of the trip device. Upon tripping of the trip device, the second locking lever is appropriately rotated, i.e., at least partially rotated. Preferably, the second locking lever is spring-loaded, e.g., by means of a torsion spring, so that the second locking lever is again moved to the starting position when the trip device does not trigger. The third link is designed in particular in the form of an elongated hole and suitably runs perpendicularly to the transverse direction when the trip device does not trigger. Alternatively, the third link is shaped like an arc. Preferably, the third link is offset away from the rotary axis of the second locking lever so that it is moved when the second locking lever is rotated. As a result, upon tripping of the trip device, the third coupling element is moved at least partially in the third link until it abuts one end of the third link. Subsequently, a force is applied to the first coupling element so that the first coupling element is moved in the first link by means of the second locking lever.

The third coupling element can be, for example, formed in one piece and preferably has a straight section. In particular, the third coupling element is straight or U-shaped in the manner of a clamp. This makes assembly comparatively simple. The third coupling element is expediently made of a metal, preferably of a steel, in particular a steel wire. In a further alternative, the third coupling element is, for example, bent or made up of several components which thus act as deflectors. This facilitates adaptation to the prevailing conditions.

For example, the busbar can be arranged along the transverse direction and thus adjusted when the slider is moved in the transverse direction. This provides a relatively compact circuit breaker. Particularly preferably, however, the busbar is arranged along a longitudinal direction which is perpendicular to the transverse direction. The electrical contacting of the busbar is thus simplified. In this case, the busbar is also suitably mounted in the longitudinal direction by means of the slider, so that the busbar can only be moved in the transverse direction. Consequently, durability is increased.

Preferably, the circuit breaker can have a further busbar extending along the longitudinal direction. The two busbars are thus arranged parallel to one another, wherein the latter suitably overlap along a certain section. In the closed position, the busbar is in mechanical contact with the further busbar, for example directly, or indirectly via further components. At least, however, in the closed position the busbar is electrically connected to the further busbar. In the open position, the busbar is mechanically separated from the further busbar. This means that no electrical current can flow from the busbar to the further busbar, and vice versa. In other words, the two busbars are galvanically isolated from each other in the open position.

Preferably, a connection of the circuit breaker with the further busbar is electrically contacted so that an electrical potential is applied to the further busbar during operation, or at least so that the further busbar is rigidly connected to further components of any circuit to be protected. Thus, construction is simplified. The further busbar is expediently made of the same material as the busbar, preferably a copper, which for example is provided with a coating. The further busbar is, for example, rigidly arranged, in particular rigidly attached to the possible housing, which simplifies construction. Alternatively, the further busbar is mounted so as to be movable and preferably spring-loaded. Here, the springs act in the direction of the busbar so that, when the busbar is moved into the closed position, the further busbar is also moved against the spring force. This means that the two busbars are in frictional contact with each other in the closed position, which prevents the two busbars from moving away from each other unintentionally due to adverse conditions. This also improves electrical contact between the two busbars.

The further busbar preferably carries a first contact and a second contact, which are spaced apart in the longitudinal direction. The distance is expediently greater than 4 mm, 5 mm, or 1 cm. For example, the distance is less than 5 cm, 4 cm, or 3 cm. For example, the distance is essentially equal to 2 cm, with a deviation of up to 10%, 5% or 0% in particular. Furthermore, the further busbar has a first power connection. The first power connection is used for electrical contact between the further busbar and further components of the circuit breaker.

In particular, the first power connection can be realized by means of a clamp or the like. Alternatively, the first power connection is molded onto the possible further components, so that the further busbar is connected to the further component at the first power connection. The first power connection conveniently forms one end of the other busbar in the longitudinal direction.

The busbar carries a first mating contact and a second mating contact, which are spaced apart in the longitudinal direction. In this case, the distance is expediently greater than 4 mm, 5 mm, or 1 cm. For example, the distance is less than 5 cm, 4 cm, or 3 cm. Preferably, the distance is substantially equal to 2 cm, with a deviation of up to 10%, 5% or 0% in each case. Due to such a spacing, a comparatively compact circuit breaker is realized.

In addition, the second busbar can have a second power connection. In particular, the second power connection forms the boundary of the second busbar in the longitudinal direction, i.e., of one of the ends of the second busbar in the longitudinal direction. The second power connection is used to electrically connect the second busbar to further components of the circuit breaker. For example, the second power connection is designed as a clamp. Alternatively, the busbar is connected to another component at the second power connection, so that the second busbar can be molded to another component by means of the second power connection and is thus integral with it. Preferably, the other component is connected to the second power connection by means of a stranded wire and, expediently, is electrically contacted therewith by means of the latter. This means that electrical contact is maintained even if the busbar moves in the transverse direction.

The further busbar partially overlaps the busbar along the longitudinal direction. Also, the contacts and the mating contacts are located in the longitudinal direction between the two power connections in the overlapping area. Here, the first contact is associated with the first mating contact and the second contact is associated with the second mating contact, and these are then, when the busbar is in the closed position, preferably mechanically in direct contact with each other. The contacts and the mating contacts are preferably used to conduct the electrical current.

Due to the spacing of the contacts and the mating contacts in the longitudinal direction, a section of the respective busbar is formed between them in each case, with which a part of the electrical current is conducted in the electrically conductive state. In this case, the electrical current is conducted parallel to each other in the longitudinal direction in both busbars. As a result, magnetic fields are formed in the same direction, which is why a magnetic attractive force acts at least partially between the two busbars in this area. In particular, the force here is essentially proportional to the product of the electrical current carried by the contacts or mating contacts and the ratio of the distance between the contacts or between the mating contacts and the distance between the two busbars.

This magnetic force is directed counter the force that is generated in the contacts and the mating contacts, which pushes the two busbars apart. As a result, the resulting forces acting on the busbars as the electrical current increases are comparatively small. Therefore, the force required to keep the circuit breaker in the electrically conductive state, i.e., the busbar in the closed state, is comparatively low. This simplifies the construction of the mechanism.

Preferably, at least one of the contacts, preferably all of the contacts, and/or one of the mating contacts, expediently all of the mating contacts, are made from a silver-based contact material. Preferably, the silver-based contact material is silver nickel (AgNi), silver tin oxide ($AgSnO_2$), silver tungsten (AgW) or silver graphite (AgC). In this way, a comparatively strong contact or mating contact is created.

As an alternative to this, for example, the further busbar can have only a single contact and the busbars only a single mating contact, which, for example, are made of the same material, for example, a silver alloy. In a further alternative, the circuit breaker comprises an additional busbar, which is spaced apart from the further busbar and is preferably arranged with the latter on a common straight line. In the electrically conductive state of the circuit breaker, the further busbar and the additional busbar are bridged by means of the busbar, which is thus preferably mechanically in direct contact with the further busbar and the additional busbar. Consequently, a current between the further busbar and the additional busbar is enabled via the busbar. In the open state, however, the busbar is spaced apart from both the further busbar and the additional busbar. This results in a double interruption, which prevents arcing when the circuit breaker is switched, i.e., when the busbar is moved from the closed into the open position.

For example, the trip device can be hydraulic, magnetic, or thermal. As an alternative, the trip device can be a combination thereof. In this case, a magnetic field is generated as a function of the electrical current flowing over the circuit breaker, which leads to the triggering of the trip device. Alternatively, heating is used to trigger the trip device. Particularly preferably, the tripping device comprises a bimetal/bimetallic element, such as a bimetal strip or a bimetal snap disc, and is formed, for example, by means of the latter. Here, the bimetal/bimetal element/bimetal strip/bimetal snap disc is preferably rigidly clamped at the end, suitably on the possible housing. The opposite end is, for example, in direct mechanical contact with the mechanism, preferably with one of the possible locking levers. During operation, the electrical current conducted by the circuit breaker flows through the bimetal/bimetal element/bimetal strip/bimetal snap disc, so that in the event of an excessively strong electrical current, the bimetal/bimetal element/bimetal snap disc is heated and consequently deformed. Thus, a comparatively durable trip device is provided.

The invention also relates to a power breaker with such a circuit breaker. The circuit breaker is designed to provide galvanic isolation of current-carrying components when the busbar is in the open position. Expediently, the power breaker has a fuse connected electrically in series to the circuit breaker. Thus, safety is further increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
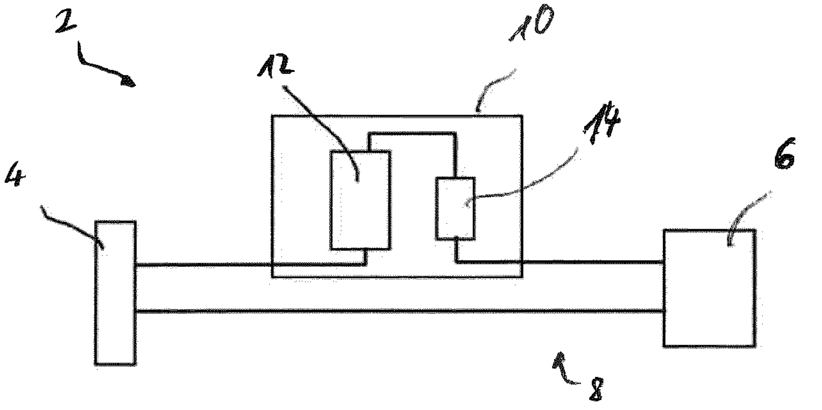
FIG. 1 shows a schematic diagram of an industrial plant with a circuit breaker.

FIG. 1 shows a schematic diagram of an industrial plant 2, which has a power supply 4 and an actuator 6 operated by it. The power supply 4 provides an alternating voltage at 50 Hz or 60 Hz. The electrical voltage is in particular 277 V or 480V. The actuator 6 comprises, for example, an electric motor or a press and is electrically coupled to the power supply 4 by means of a line 8, so that power is supplied to the actuator 6 via the line 8.

Furthermore, the industrial plant 2 comprises a power breaker 10, which in one embodiment is a part of the line 8 and is arranged in a control cabinet which is not shown in detail. In an alternative embodiment, the power breaker 10 is arranged on the power supply 4 or on the actuator 6. The power breaker 10 has a circuit breaker 12 and a fuse 14 connected in series therewith. The circuit breaker 12 has a separating function, and the electrical series connection is introduced into one of the wires of the line 8.

In this example, the rated current of the power breaker 10 is 60 A, and if the rated current is exceeded by more than a certain limit value, for example 1.1 times the rated current, the electrical current is interrupted by means of the circuit breaker 12. In other words, in this case the circuit breaker 12 is tripped and thus opened, i.e., set to the electrically non-conductive state. The fuse 14, on the other hand, which in this example is designed as a glass tube fuse, does not blow in this case. It only blows when the power exceeds a factor of five of the rated current, i.e., 300 A or more, wherein the release time is shorter than the release time of the circuit breaker 12. In this case, the electrical current is interrupted by the fuse 14, while the circuit breaker 12 continues to be in the electrically conductive state. Due to such an interconnection of the circuit breaker 12 and the fuse 14, if the electrical current exceeds the rated current by comparatively little, the power breaker 10 is essentially ready for operation without delay by resetting the circuit breaker 12. Also, replacement of the component is not required, which reduces operating costs. However, if the overcurrent is comparatively large, i.e., in particular greater than 300 A, damage is possible during switching by means of the mechanically equipped circuit breaker 12. In this case, an arc occurs which can damage the components of the circuit breaker 12. Since the circuit breaker 12 is not tripped, it is not damaged and the power breaker 10 is ready for use again after replacing the fuse 14.

Figure 2:
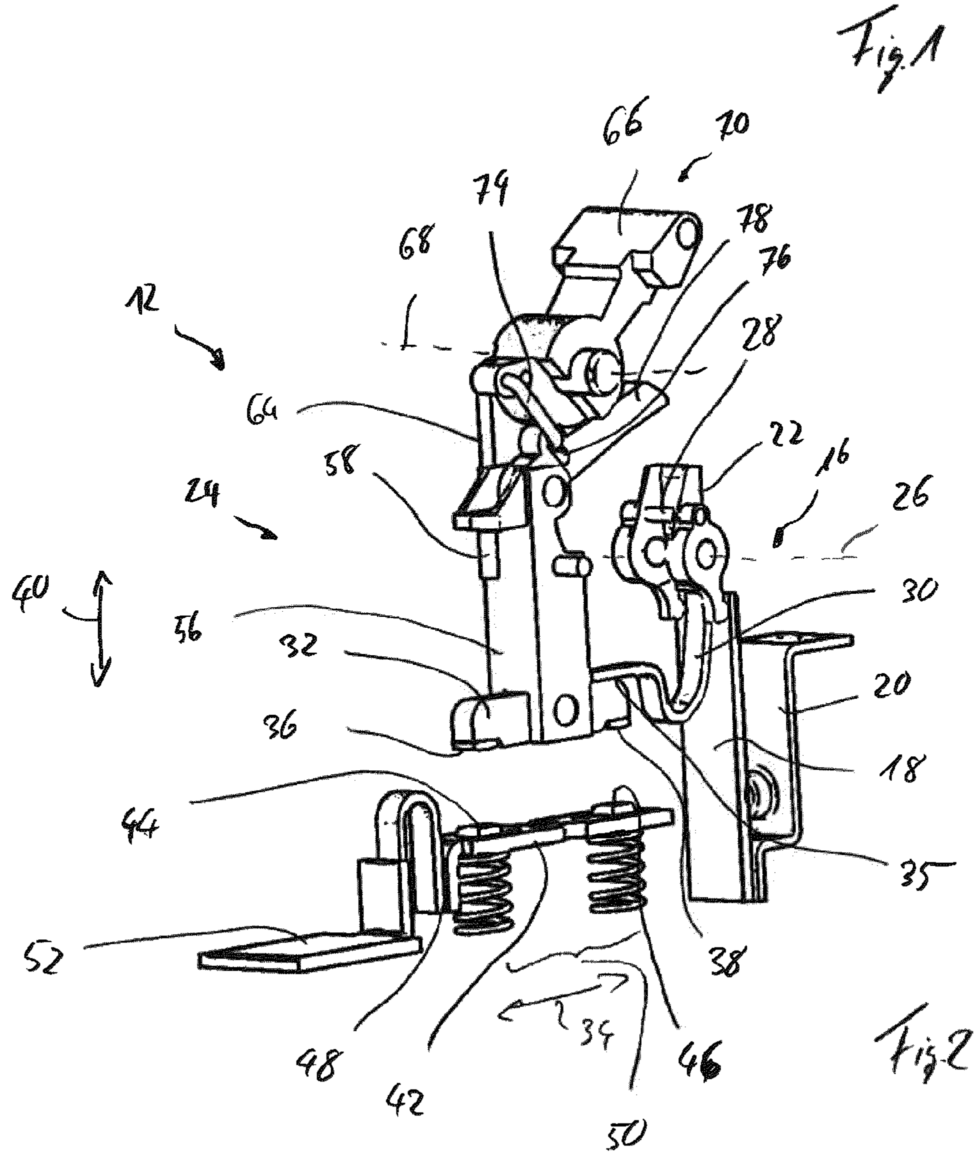
FIGS. 2 and 3 show in each case a perspective view of an exemplary embodiment of the circuit breaker, which has a hand lever and a busbar.
Figure 3:
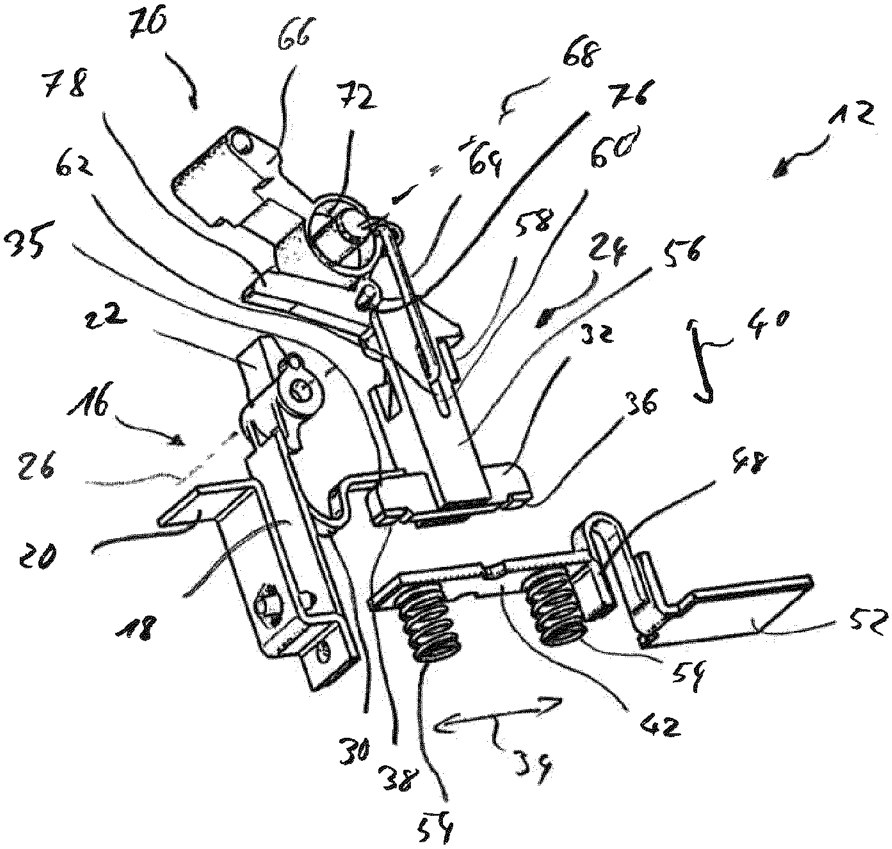

FIGS. 2 and 3 each show a partial perspective view of a first embodiment of the circuit breaker 12. The circuit breaker 12 has a trip device 16, which comprises a bimetal strip 18. The bimetal strip 18 is strip-shaped and is firmly connected at one of its ends to a first terminal strip 20 and is thus electrically contacted with the latter. This end is rigidly attached to a housing of the circuit breaker 12, which is not shown in detail, wherein the housing is made of an electrically non-conductive plastic. The first terminal strip 20 is made of an electrically conductive material, namely a copper alloy or pure copper, and is also strip-shaped, one of the ends being attached to the bimetal strip 18. The remaining end of the first terminal strip 20 forms one of the terminals of the circuit breaker 12, which is connected in particular to the fuse 14. In one embodiment, this end of the first terminal strip 20 protrudes from the housing, which is not shown in detail.

The remaining end of the bimetal strip 18 is freely movable with respect to the housing of the circuit breaker 12, which is not shown in detail. This end lies eccentrically on a first locking lever 22 of a mechanism 24, which is mounted rotatably about a bearing axis 26 on the housing, which is not shown in detail. Furthermore, the first locking lever 22 has a support point 28 which is also arranged eccentrically and is located on the side opposite the bimetal strip 18 with respect to the bearing axis 26. The support point 28 is formed by means of a rod-shaped section of the first locking lever 22, which is integrally formed of a plastic, running parallel to the bearing axis 26. When the bimetal strip 18 is bent, the first locking lever 22 is partially rotated about the bearing axis 26, so that the support point 28 is also rotated about the bearing axis 26. Thus, the first locking lever 22 is actuated by means of the trip device 16.

Further, an elastically deformable stranded wire 30 is connected to the freely movable end of the bimetal strip 18 by welding or soldering. Thus, the stranded wire 30 is electrically contacted by the bimetal strip 18. The remaining end of the stranded wire 30 is attached to a busbar 32 and electrically contacted by it. The busbar 32 runs in a longitudinal direction 34 and is stamped from a copper sheet and provided with a silver coating. The contact point of the stranded wire 30 with the busbar 32, which is offset furthest out in the longitudinal direction 34, forms a second power connection 35. A first mating contact 36 and a second mating contact 38 are located at the two ends of the busbar 32 in the longitudinal direction 34. The two mating contacts 36, 38 are thus spaced apart from one another in the longitudinal direction 34. The two mating contacts 36, 38 are arranged on one of the sides of the busbar 32 and are made of a silver nickel and electrically contacted with the busbar 32.

The mating contacts 36, 38 point in a transverse direction 40, which is perpendicular to the longitudinal direction 34, to a further busbar 42, which is arranged along the longitudinal direction 34. The first mating contact 36 is located in the transverse direction 40 above a first contact 44, and the second mating contact 38 is located in the transverse direction 40 above a second contact 46, each of which carries the further busbar 42 and point towards the busbar 32. Thus, the two contacts 44, 46 are likewise spaced apart relative to each other in the longitudinal direction 34. The two contacts 44, 46 are made of the same material as the mating contacts 36, 38, i.e., a silver nickel, and the further busbar 42 is stamped from a copper sheet and also provided with a silver coating. The further busbar 42 runs perpendicular to the busbar 32 and perpendicular to the transverse direction 40. In contrast, the busbar 32 runs parallel to the longitudinal direction 34 and parallel to the transverse direction 40.

The further busbar 42 has a first power connection 48, wherein contacts 44, 46 and mating contacts 36, 38 extend in the longitudinal direction 34 between the first power connection 48 and the second power connection 35 in an overlapping area 50 in which the busbar 32 overlaps with the further busbar 42. The first power connection 48 is arranged outside the overlapping area 50. A second terminal strip 52 is connected to the first power connection 48 and is electrically contacted. The second terminal strip 52 also protrudes from the housing of the circuit breaker 12, which is not shown in detail, and is used to connect to the line 8.

The circuit breaker 12 further comprises two springs 54, which are helical springs, and which extend in the transverse direction 40. The springs 54 are arranged between a bottom of the housing, not shown in detail, and the further busbar 42 and are supported thereon. In this case, it is possible to move the further busbar 42 in the transverse direction 40 against the springs 54, wherein the springs 54 are tensioned.

The mechanism 24 further comprises a slider 56 mounted longitudinally displaceably in the transverse direction 40, which is arranged in the transverse direction 40, and at which ends the busbar 32 is attached in the transverse direction 40. In this way, the busbar 32 is also mounted for movement in the transverse direction 40. The slider 56 has a transverse extension 58 by means of which a spring, not shown in detail, is guided, and mounted thereon. The spring is further supported on a housing not shown in detail. By means of the spring, a spring loading of the slider 56 follows, wherein the direction of movement in the transverse direction 40 is directed away from the further busbar 42.

The slider 56 has a first link 60 formed as an elongated hole running in the transverse direction 40. The first link 60 is thus formed by means of a section 62 extending in the transverse direction 40. A first coupling element 64 is guided in the first link 60, which is made of a steel wire to form a U-shaped clamp, wherein one of the parallel legs is arranged in the first link 60. The leg extending transversely thereto runs parallel to the transverse direction 40, and the other of the legs extending in parallel is rotatably mounted on a hand lever 66, one free end of which also protrudes from the first housing. The hand lever 66 is rotatably mounted about a rotational axis 68. The connection of the first coupling element 64 is eccentric to the axis of rotation 68 and thus spaced therefrom, wherein the rotatable bearing of the coupling element 64 is parallel to the axis of rotation 68. In summary, the hand lever 66 is rotatable about the axis of rotation 68 and can consequently assume a first position 70, which is shown in the figures. In other words, the hand lever 66 can be brought into the first position 70. Here, the hand lever 66 has a receptacle 72 within which a torsion spring, not shown in more detail, is arranged by means of which the lever 66 is spring-loaded into the first position 70. In other words, when no further forces are acting on the hand lever 66, the latter is brought into the first position 70 by means of the torsion spring. When moving out of the first position 70, on the other hand, the torsion spring, which is arranged concentrically to the axis of rotation 68, is tensioned.

A second coupling element 74 is also rotatably mounted on the hand lever 66, wherein the bearing axis runs parallel to the axis of rotation 68. The second coupling element 74 is again U-shaped and designed as a clamp and made of a steel wire. One of the mutually parallel legs is connected to the hand lever 66, wherein the distance to the axis of rotation 68 is greater than the distance of the first coupling element 64 to the axis of rotation 68. The remaining parallel leg of the second coupling element 74 is guided in a second link 76 of a rocker arm 78, which is rotatably mounted on the slider 56. Here, the connection of the rocker arm 78 is located at the end of the slider 56 opposite the busbar 32 in the transverse direction 40. The second link 76 is spaced apart from the point of attachment on the slider 56 and extends in a substantially straight line. In addition, the rocker arm 78 is rotatable about an axis that is parallel to the axis of rotation 68.

Figure 4:
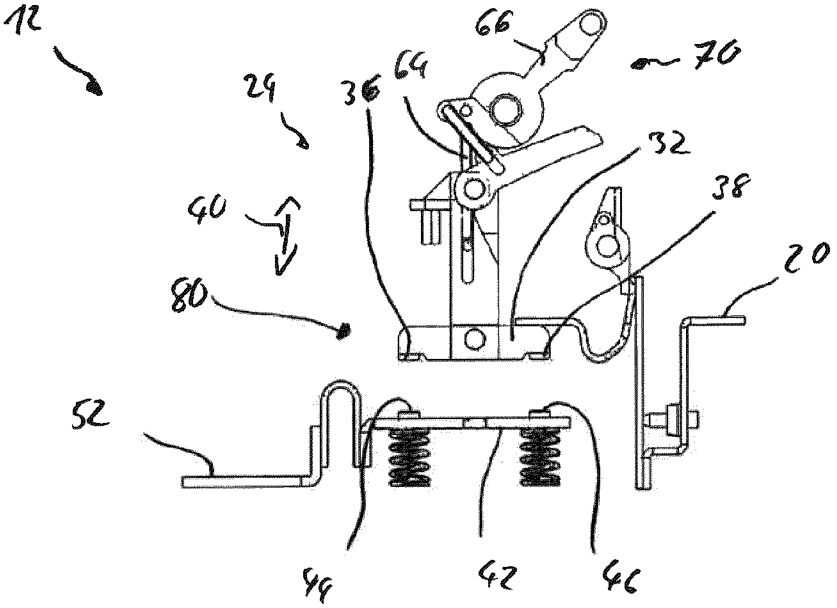
FIG. 4 shows a side view of the circuit breaker in an open position.
Figure 5:
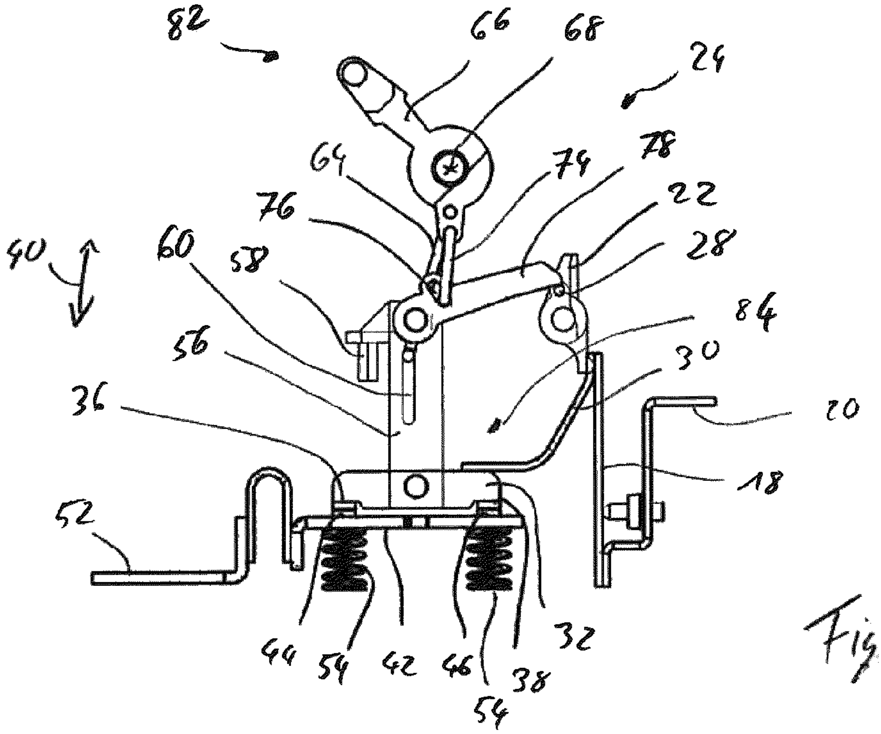
FIG. 5 shows, according to FIG. 4, the circuit breaker in the closed state.
Figure 6:
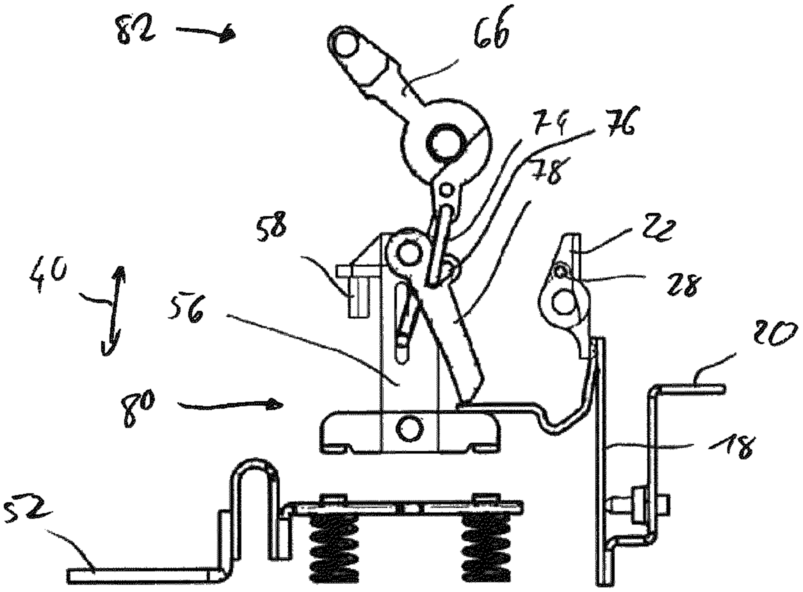
FIG. 6 shows, according to FIG. 4, the circuit breaker in the open state, with the hand lever blocked.

FIG. 4 shows a section of the circuit breaker 12 in a side view. Here, the circuit breaker 12 is in an electrically non-conductive state. In other words, the first terminal strip 20 and the second terminal strip 52 are galvanically isolated from each other. This is the case when the busbar 32 is in an open position 80, where the busbar 32 is spaced apart from the further busbar 42 by means of the mechanism 24, so that the contacts 44, 46 and the mating contacts 36, 38 are not mechanically in contact with each other. In this case, the hand lever 66 is in the first position 70.

When the hand lever 66 is pivoted about the axis of rotation 68 into a second position 82, the second coupling element 74 is moved in the second link 76 until it reaches the end of the second link 76. With a further application of force, the second coupling element 74 cannot be moved in the transverse direction with respect to the second slider 76, and the rocker arm 78 is pivoted with respect to the slider 56 until the end of the rocker arm 78 rests against the support point 28 of the first locking lever 22. Until then, there is no movement of the slider 56 in the transverse direction due to the spring supported on the extension 58. However, when the rocker arm 78 abuts the support point 28, the former cannot be pivoted further, and the support point 28 forms a bearing point for the rocker arm 78, which is thus pivoted about the support point 28. As a result, the slider 56 is moved in the transverse direction 40 until the mating contacts 36, 38 bear mechanically directly against the contacts 44, 46 carried by the further busbar 42. With a further movement of the hand lever 66, the springs 54 are compressed so that the two busbars 32, 42 are in frictional contact with each other. The slider 56 and therefore also the hand lever 66 are moved until the second coupling element 74 runs essentially in the transverse direction 40. A further movement of the hand lever 66 is then prevented by a stop, not shown in detail, and the hand lever 66 is in the second position 82. Thus, the hand lever is movable between the first and second positions 70, 82. In this case, the mechanism 24 is in an unstable equilibrium due to the spring engaging the extension 58, and the busbar 32 is in a closed position 84.

During the movement of the hand lever 66 from the first position 70 into the second position 82, the first coupling element 64 slides along unhindered in the first link 60. For better clarity, the slider 56 is shown semi-transparent in the figures.

When the bus bar 32 is in the closed position 84, an electrical current flow is possible from the first busbar 20 via the bimetal strip 18, the stranded wire and the busbar 32 and the mating contacts 36, 38, via the contacts 44, 46 to the further busbar 42 and from there, to the second terminal strip 52. As a result, the circuit breaker 12 is in the electrically conductive state.

Due to the arrangement of the mating contacts 36, 38 as well as of the contacts 44, 46, a direction of the electrical current in the busbar 32 as well as in the further busbar 42 is directed parallel to each other at least in the overlapping area 50, which is why a rectified magnetic field is induced there. Due to the magnetic field induced in this way, the two busbars 32, 42 are pressed towards each other in the transverse direction 40 so that there is relatively secure electrical contact. To reinforce this effect, the busbar 32 is bulged out in the overlapping area 50 between the two mating contacts 36, 38 towards the further busbar 42, wherein the two busbars 32, 42 are not mechanically in direct contact with each other in this area.

When the hand lever 66 is moved from the second position 82 into the first position 70, the sequence of movements is reversed so that, by means of actuation of the hand lever 66, the busbar 32 is brought into the open position 80. The movement is supported by the spring acting on the extension 58 and by the torsion spring.

If a comparatively large electrical current is passed through the bimetal strip 18, leading to warming, the freely movable end of the bimetal strip 18 is bent so that the first locking lever 22 is rotated. In consequence, the support point 28 is no longer held by the rocker arm 78. The latter is pivoted further with respect to the slider 56. In this case, the second link 76 is also pivoted and thus the second coupling element 74 is moved. As a result, the unstable equilibrium is canceled and the slider 56 is moved in the transverse direction 40 by means of the spring acting on the extension 58, so that the busbars 32 are moved away from the further busbar 42. As a result, the contacts 44, 46 are spaced from the mating contacts 36, 38 so that the current is interrupted. Due to the mechanical coupling by means of the second coupling element 74, the hand lever 66 is also brought into the first position 70, so that the circuit breaker 12 is again in the state shown in FIG. 4, where the bimetal strip 18 is still bent, for example. After cooling, however, it is again in the position shown in FIG. 4. Furthermore, the rotary movement of the hand lever 66 is supported by means of the torsion spring, not shown in detail.

However, if the hand lever 66 is blocked in the first position 70, and the bimetal strip 18 is bent due to excessive current flow, the first locking lever 22 is again moved so that the support point 28 does not further support the rocker arm 78. Thus, further pivoting of the rocker arm 78 with respect to the slider 56 is possible while moving the second coupling element 74 in the second link 76. Thus, the unstable equilibrium is canceled and the slider 56 can be moved in the transverse direction 40 by means of the spring acting on the extension 58, so that the busbar 32 is brought into the open position 80. In this case, the electrical current between the two terminal strips 20, 52 is also interrupted.

Figure 7:
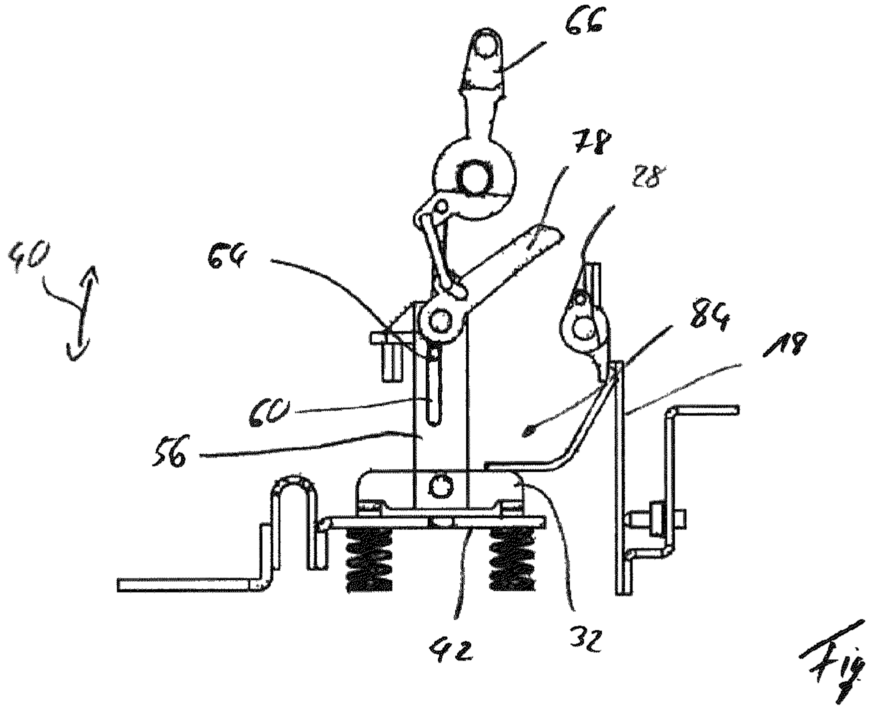
FIG. 7 shows, according to FIG. 4, the circuit breaker in the closed state, with a blocked busbar.

If the busbar 32 is blocked in the closed position 84, as shown in FIG. 7, and if the rocker arm 78 is not in contact with the support point 28, for example due to a manual movement of the hand lever 66 from the second position 82 into the first position 70, or if the trip device 16 has triggered, movement of the hand lever 66 into the first position 70 is not possible. In this case, the first coupling element 64 is moved to the stop in the first link 64, and the abutment prevents further movement of the hand lever 66. When force is applied to the hand lever 66 in the direction of the first position 70, this force is applied to the slider 56 and consequently to the busbar 32. This makes it possible, by means of a manual operation of the hand lever 66, to release the busbar 32 from the further busbar 42 and to break a possible fusion of the contacts 44, 46 with the mating contacts 36, 38.

In summary, the mechanism 24 couples the busbar 32, the trip device 16 and the hand lever 66. When moving the hand lever 66 from the first position 70 into the second position 82, the busbar 32 is brought from the open position 80 into the closed position 82. When the trip device 16 has triggered, the busbar 32 is moved from the closed position 84 into the open position 80. In this case, the hand lever 66 is moved from the second position 82 into the first position 70 if the hand lever 66 is not blocked. Otherwise, at least the busbar 32 is moved accordingly. When moving the hand lever 66 from the second position 82 into the first position 70, the busbar 32 is moved from the closed position 84 into the open position 80. This is done regardless of whether the busbar 32 is blocked in the closed position 84. In this case, the blockage of the busbar 32 is released by means of the force manually applied to the hand lever 66.

Figure 8:
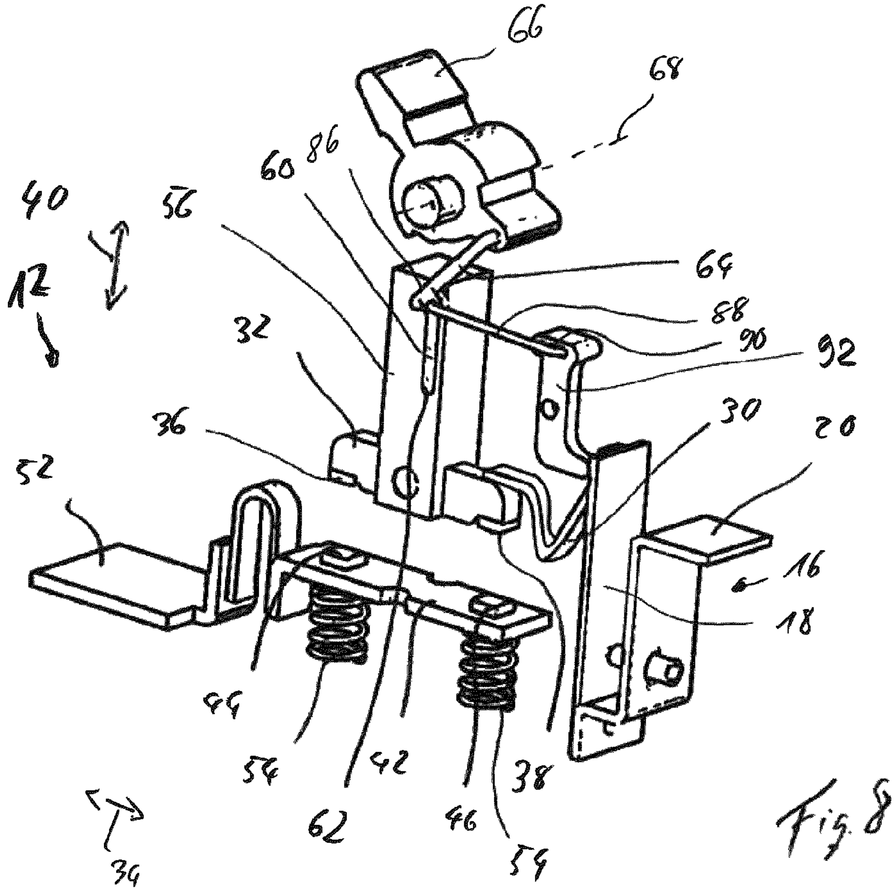
FIG. 8 shows a perspective view of an exemplary embodiment of the circuit breaker.

FIG. 8 shows a perspective section of a second variant of the circuit breaker 12, wherein the two terminal strips 20, 52, the busbar 32 with the two mating contacts 36, 38 and the stranded wires 30 have not changed. The further busbar 42 and the contacts 44, 46 and the springs 54 have also not changed. Further, the function and the arrangement of the individual components to each other have not changed. The slider 56 is again present, which has the first link 60 with the section 62 extending in the transverse direction 40, in which the first coupling element 64 is guided. However, here the first link 60 also comprises a further section 86, which extends in the longitudinal direction 34, as shown in FIGS. 9-12, in which the circuit breaker 12 is shown in a side view. Thus, the first link 60 is L-shaped. Here, the further section 86 is offset in the transverse direction 40, with respect to the section 60, from the busbar 32 toward the hand lever 66.

The first coupling element 64 is in turn eccentrically and rotatably attached to the hand lever 66, which is rotatably mounted about the axis of rotation 68. The second coupling element 74 and the rocker arm 78 are omitted, and the mechanism 24 includes a third coupling element 88 rotatably mounted to the first coupling element 64. In this case, the connection of the third coupling element 88 to its free end and to the first coupling element 64 is located between the two ends of the latter, i.e., in the leg of the L-shaped first coupling element 64 extending in the transverse direction. The remaining end of the third coupling element 88 is guided in a third link 90 of a second locking lever 92, which is rotatably mounted on the housing in the same manner as the first locking lever 22. In other words, the first locking lever 22 is replaced by the second locking lever 92. The second locking lever 92 is actuated by means of the bimetal strip 18 of the trip device 16. As long as the trip device 16 does not trigger, i.e., as long as the bimetal strip 18 runs in the transverse direction 40, the third link 19 is essentially aligned in the longitudinal direction 34.

Figure 9:
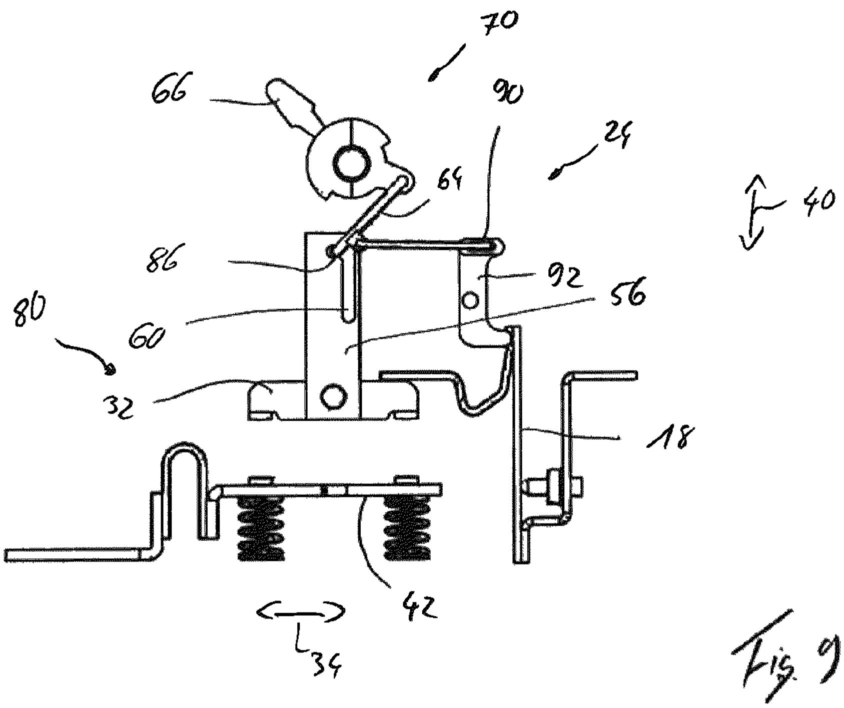
FIG. 9 shows a side view of the circuit breaker in an open state.

If the hand lever 66 is in the first position 70 shown in FIG. 9, the first coupling element 86 is engaged in the further section 86 of the first link 60, and the busbars 32 are in the open position 80.

Figure 10:
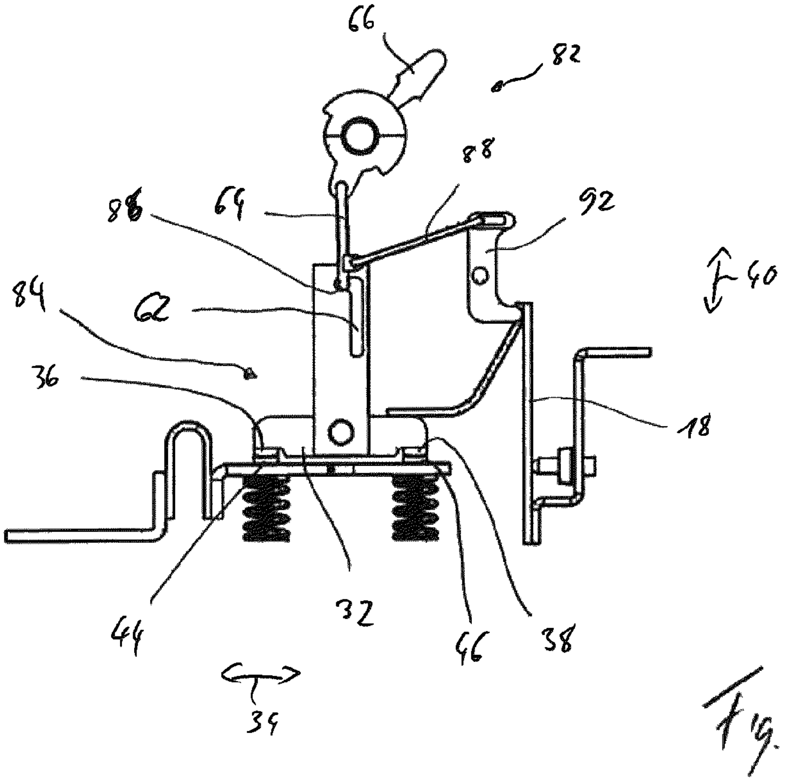
FIG. 10 shows according to FIG. 9, the circuit breaker in a closed state.

When the hand lever 66 is rotated into the second position 82 shown in FIG. 10, the first coupling element 64 is partially moved in the transverse direction 40 towards the further busbar 42. This movement acts via the first link 60 on the slider 56, which is thus moved in the transverse direction 40 towards the further busbar 42. The arrangement of the first link 60 with respect to the hand lever 66 and its direction of movement is such that the first coupling element 64 is not moved to the section 62 extending in the transverse direction 40 due to the acting direction of force. When the first coupling element 64 is arranged substantially in the transverse direction 40, the contacts 44, 46 rests against the respective mating contacts 36, 38, and the busbar 32 is in the closed position 84, as shown in FIG. 10. Here, too, an unstable equilibrium is realized. In summary, in the closed position 84, the busbar 32 is mechanically in contact with the further busbar 42.

When the hand lever 66 is manually moved from the second position 82 into the first position 70, the counter-rotating motion sequence is performed. If the trip device 16 triggers, i.e., if the free end of the bimetal strip 18 is moved, the second locking lever 92 is moved and, as a result, also the third locking lever 92. By means of this, a force is thus exerted on the first coupling element 64 in the longitudinal direction 34, so that the unstable equilibrium is canceled. In this case, the unstable equilibrium is canceled even with a comparatively small movement of the third coupling element 88, so that the first coupling element 64 continues to be located in the further section 86. Because of the removal of the equilibrium, the slider 56 is moved away from the further busbar 42 in the transverse direction 40 into the open position 80, which is shown in FIG. 9, due to the spring, which is not shown in detail. In the open position 80, the busbar 32 is mechanically separated from the further busbar 42. Also, via the first coupling element 64, the spring force acting on the slider 56 also acts on the hand lever 66, which thus rotates to the first position 70. The rotary movement is also supported by the torsion spring.

Figure 11:
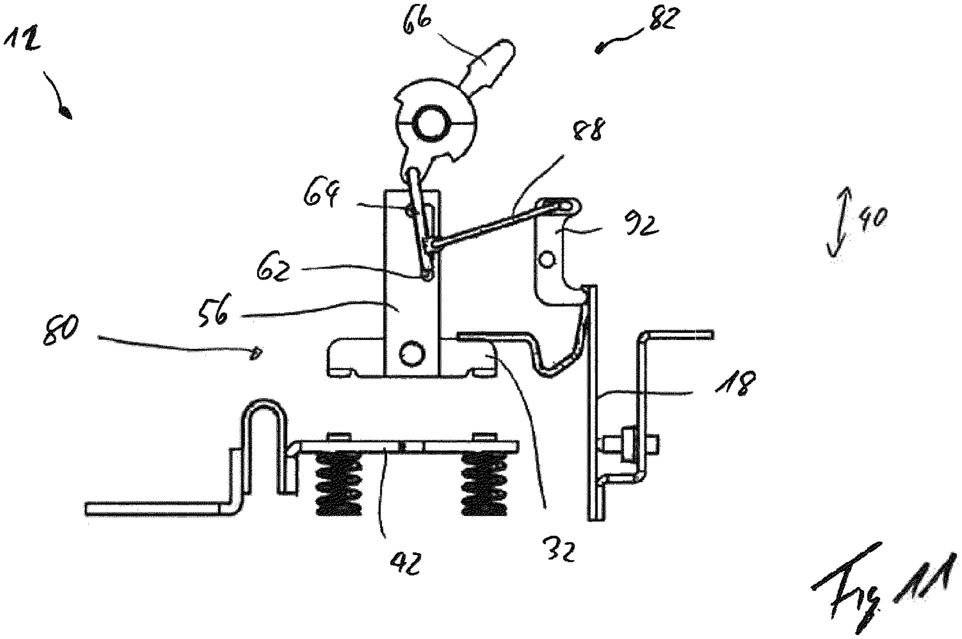
FIG. 11 shows according to FIG. 9, the circuit breaker in the open state, with the hand lever blocked.
Figure 12:
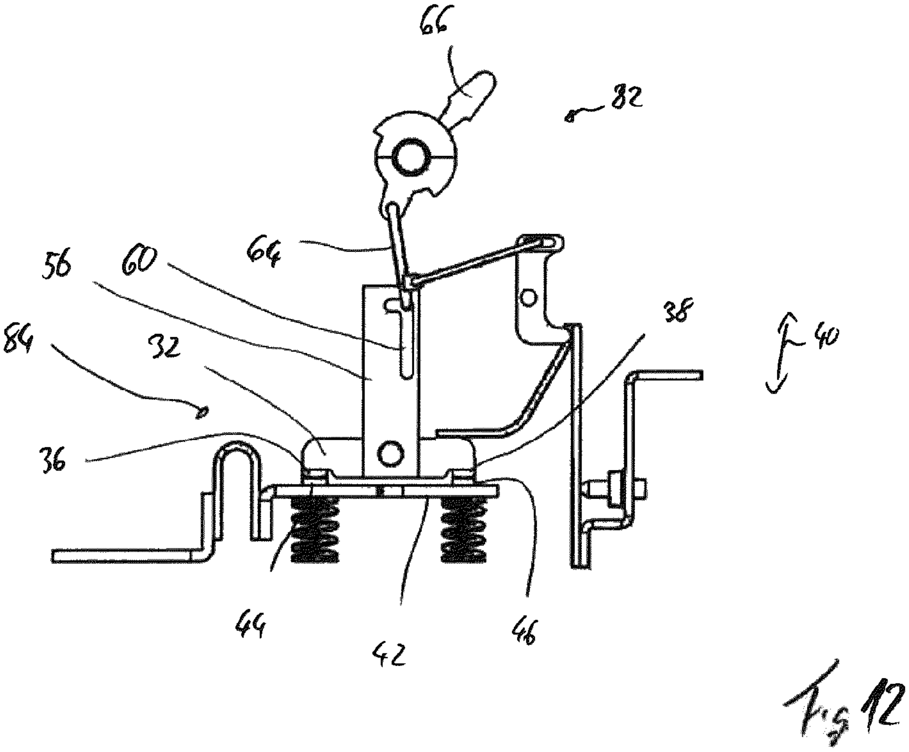
FIG. 12 shows according to FIG. 9, the circuit breaker in the closed state, with a blocked busbar.

If the hand lever 66 is blocked in the second position 82, as shown in FIG. 11, and if the trip device 16 triggers, i.e., the free end of the bimetal strip 18 is moved, the first coupling element 64 is moved by the third coupling element 88 further into the section 62 of the first link 62 extending in the transverse direction 40. As a result, a movement of the slider 56 in the transverse direction away from the further busbar 42 is possible. Therefore, the slider 56 is moved in the transverse direction 40 by means of the spring and the busbar 32 is spaced from the further busbar 42 and thus brought into the open position 80.

If the busbar 32 is held in the closed position 84 due to fusion of the contacts 44, 46 with the mating contacts 36, 38 and is thus blocked, the first coupling element 64 continues to engage in the first link 60, namely at the stop of the first link 60 in the transverse direction, which is located the furthest from the further busbar 42. When the hand lever 66 is rotated, the first coupling element 64 is partially moved away from the further busbar 42 in the transverse direction 40, so that a force directed away from the further busbar 42 is applied to the slider 56. Consequently, the possible fusion is broken and thus, the busbar 32 is brought from the closed position 84 into the open position 80 when the busbars 32 are blocked in the closed position 84. In this case, the blockage is removed by means of the force actuation.

Figure 13:
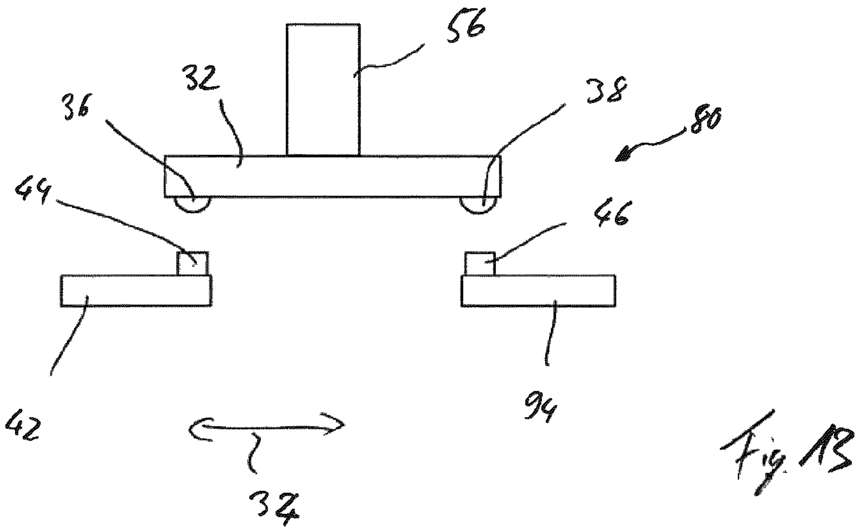
FIG. 13 shows a further embodiment of the busbar.

FIG. 13 schematically illustrates another variation of the circuit breaker 12 in a simplified form. The slider 56 and the busbar 32 connected thereto are again shown with the first mating contact 36 and the second mating contact 38, which are spaced apart in the longitudinal direction 34. Also present is the further busbar 42 carrying the first contact 44, which is structurally the same as in the previous embodiments. However, the further busbar 42 is offset in the longitudinal direction 34 so that the overlapping area 50 is reduced. Furthermore, an additional busbar 94 is provided which carries the second contact 46. The further busbar 42 and the additional busbar 94 are galvanically isolated from each other, and the stranded wire 30 is soldered to the additional busbar 94, which in turn is electrically connected to the bimetal strip 18. In the open position 80 shown in FIG. 13, the mating contacts 36, 38 are spaced apart from the contacts 44, 46. When the closed position 84 is assumed, the first mating contact 36 is brought against the first contact 44 and the second mating contact 38 is brought against the second contact 46, so that the further busbar 42 and the additional busbar 94 are bridged by the busbar 32. In this case, current conduction is possible. The further busbar 42 and the use of the additional busbar 94 are modified in variations, not described in detail here, of the embodiments of the circuit breaker 12 shown in FIG. 2 to FIG. 12.

The invention is not limited to the above-described exemplary embodiments. Rather, other variations of the invention can also be derived therefrom by the person skilled in the art without departing from the subject matter of the invention. In particular, all individual features described in connection with the individual embodiments can also be combined with one another in other ways without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit breaker of a power breaker, the circuit breaker comprising:

a busbar which is mounted so as to be movable between a closed position and an open position;

a trip device;

a hand lever movable between a first position and a second position; and an operating mechanism via which the busbar, the trip device and the hand lever are coupled in such a way that:

when the hand lever is moved from the first position into the second position, the busbar is moved from the open position into the closed position, when the trip device triggers, the busbar is moved from the closed position into the open position and the hand lever is moved from the second position into the first position if the busbar is not blocked, and when the hand lever is moved from the second position into the first position, the busbar is moved from the closed position into the open position regardless of whether the busbar is blocked in the closed position, wherein the operating mechanism comprises a slider that is mounted so as to be movable in a transverse direction and is connected to the busbar, wherein the hand lever is mounted rotatably about an axis of rotation, wherein a first coupling element is rotatably mounted on the hand lever eccentrically with respect to the axis of rotation, and wherein the first coupling element is guided in a first link of the slider, which has a section extending in the transverse direction, and wherein a second coupling element is rotatably mounted on the hand lever eccentrically to the axis of rotation and is guided in a second link of a rocker arm which is rotatably mounted on the slider.

2. The circuit breaker according to claim 1, wherein the slider is spring-loaded.

3. The circuit breaker according to claim 1, wherein the operating mechanism has a torsion spring via which the hand lever is spring-loaded into the first position.

4. The circuit breaker according to claim 1, wherein the operating mechanism has a rotatably mounted first locking lever which is actuated by the trip device, and wherein the first locking lever has an eccentrically arranged support point for the trip device.

5. The circuit breaker according to claim 1, wherein the busbar is arranged along a longitudinal direction which is substantially perpendicular to the transverse direction.

6. The circuit breaker according to claim 5, further comprising a further busbar arranged along the longitudinal direction, wherein in the closed position the busbar mechanically rests against the further busbar, and wherein in the open position the busbar is mechanically separated from the further busbar.

7. The circuit breaker according to claim 6, wherein, the further busbar carries a first contact and a second contact spaced longitudinally therefrom and has a first power connection, and wherein the busbar carries a first mating contact and a second mating contact spaced longitudinally therefrom and has a second power connection, wherein the busbar partially overlaps with the further busbar along the longitudinal direction in an overlapping area, and wherein the first and second contacts and the first and second mating contacts are arranged longitudinally between the first and second power connections in the overlapping area.

8. The circuit breaker according to claim 1, wherein the trip device has a bimetal strip.

* * * * *